June 5, 1962    R. GOUIRAND    3,037,790
KNEE ACTION PNEUMATIC SUSPENSION FOR VEHICLES
Filed March 16, 1960
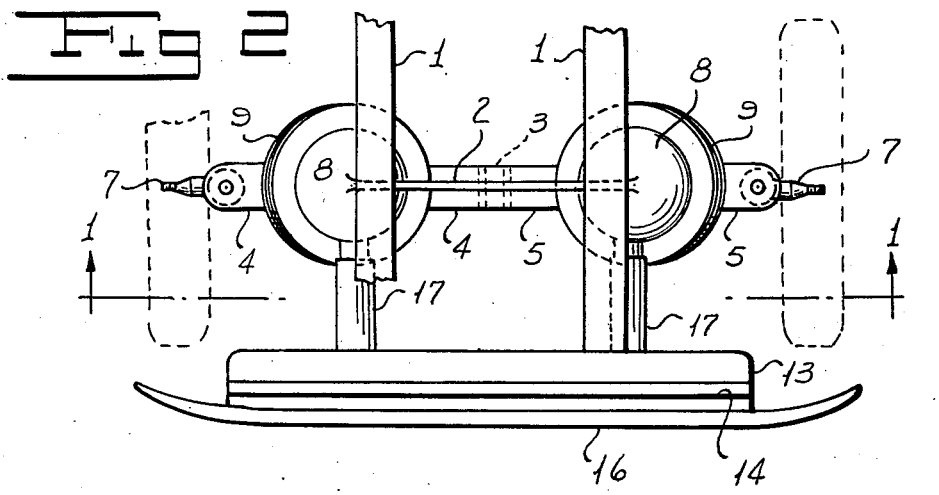
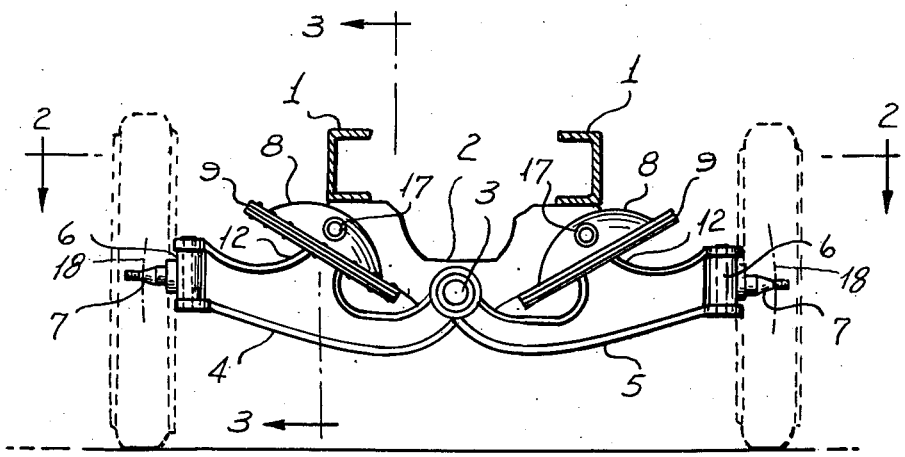
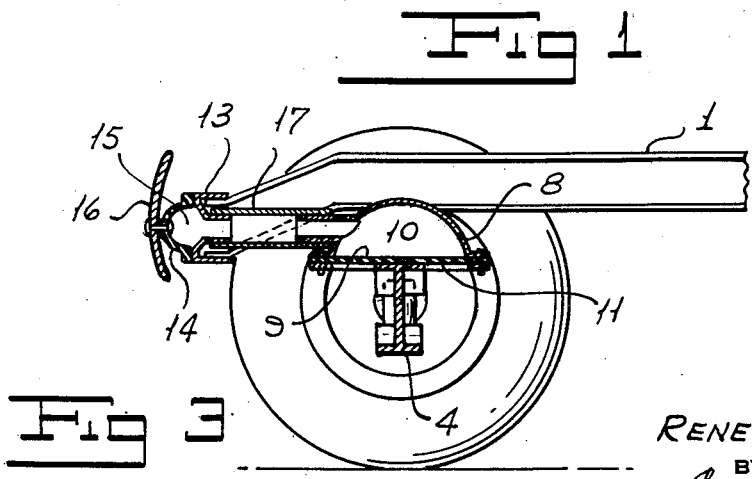
INVENTOR
RENE GOUIRAND
BY
Cornelius Zabriskie
ATTORNEY

United States Patent Office 3,037,790
Patented June 5, 1962

3,037,790
KNEE ACTION PNEUMATIC SUSPENSION FOR VEHICLES
Rene Gouirand, 210 W. 88th St., New York, N.Y.
Filed Mar. 16, 1960, Ser. No. 15,415
1 Claim. (Cl. 280—124)

This invention is a knee action pneumatic suspension for vehicles.

A characteristic novel feature of the knee action suspension of this invention is that the lever sections which carry the wheel spindles are mounted midway of the width of the chassis on a pivot common to both of them, so that both of said levers articulate about the same horizontal axis. Each of said levers is connected intermediate its ends to a flexible diaphragm forming one wall of a pneumatic suspension chamber mounted on the body or chassis of the vehicle, as the case may be, and these parts thus function as independent wheel suspensions.

A further feature of the invention embodies the use, in conjunction with said suspension chambers, of a pneumatic bumper interconnecting both chambers and serving to compensate for inequalities of air pressure in said chambers, so that the pressures in both of them may be normally maintained uniform.

Features of the invention, other than those adverted to, will be apparent from the hereinafter detailed specification and claim, when read in conjunction with the accompanying drawing.

The accompanying drawing illustrates one practical embodiment of the invention, but the construction therein shown is to be understood as illustrative, only, and not as defining the limits of the invention.

FIG. 1 is a transverse section through a vehicle embodying a pneumatic suspension of this invention, said section being taken in the vertical plane of the line 1—1 of FIG. 2.

FIG. 2 is a plan view of the structure shown in FIG. 1.

FIG. 3 is a section on the line 3—3 of FIG. 1.

Referring to the drawings, 1 designates the chassis of a vehicle which may be the vehicle body or a separate chassis frame to which the body is attached. Across the chassis extends a transverse supporting member 2 provided medially of the vehicle with a pivot pin 3 on which is mounted the inner ends of two levers 4 and 5. Antifriction bearings may be incorporated in this connection if desired. Levers 4 and 5 extend in opposite directions from the pivot 3 and carry at their outer ends steering knuckles 6 which support the usual wheel spindles 7. The steering knuckles 6 may be provided with conventional steering horns.

Mounted on the chassis above each of the levers is a casing 8. This casing may be of any shape but is shown of domed configuration closed at its bottom by a flexible diaphragm 9, so as to provide within each dome a pneumatic chamber 10. To the exterior of each diaphragm 9 is secured a plate 11 and this plate is either secured to or integral with an upstanding portion 12 of one of the underlying levers 4 or 5. Air under the desired pressure is introduced into the pneumatic chambers and serves to support the weight imposed by levers upon said diaphragms which provide independent wheel suspension for the superimposed portion of the vehicle.

In practice the longitudinal axis of the pivot 3 lies substantially in the horizontal plane of the axes of the wheel spindles 7, so that, as the levers 4 and 5 pivot, they will do so about the axis of the pivot 3 and will move in relatively flat arcs 18 indicated in FIG. 1. These arcs are of relatively large radius and consequently there will be relatively little tilting action of the wheels as the levers pivot during the passage over uneven roads.

The two pneumatic chambers 10 may be interconnected by a duct extending from one to the other, so that the pressures therein will be normally equalized. However, in the preferred form of the invention I preferably accomplish this result, with additional functions, by mounting at the contiguous end of the vehicle a pneumatically supported bumper. As best shown in FIG. 3, a rigid housing 13 extends across the end of the chassis and to this housing is secured a flexible semi-cylindrical housing portion 14, so as to form, within the bumper, a pneumatic chamber 15 which preferably extends for substantially the full width of the vehicle. Attached to the flexible housing portion 14 is the usual metallic bumper 16. The pneumatic chamber 15 of the bumper element is interconnected at each of its opposite ends by a tube 17, which may be flexible or otherwise, to the corresponding pneumatic suspension chamber.

The foregoing arrangement serves two purposes. First, it serves to compensate for changes in pressures in the two suspension chambers 10, so as to normally equalize the pressures in such chambers. Furthermore, it provides a pneumatic bumper to take up shocks due to engagement of the bumper 16 with extraneous objects.

A suspension, constituted as hereinbefore described, provides for extremely easy riding of the vehicle for the levers are relatively long and up and down movement of the wheels effect relatively little corresponding movement of the body of a vehicle. Furthermore the pivoting of the levers in the medial line of the vehicle minimizes shock which would result from direct mechanical connections to the lateral portions of the body.

Another advantage of this invention is the economies which flow from this construction which embodies a single pivot for the entire knee action at both sides of the vehicle.

The foregoing detailed description sets forth the invention in its preferred practical forms, but the invention is to be understood as fully commensurate with the appended claim.

Having thus fully described the invention, what I claim as new and desire to secure by Letters Patent is:

In a pneumatic suspension for a vehicle comprising: a vehicle body provided with a transverse supporting member carrying a pivot located medially of the body, two levers one end of each of which is mounted to articulate on the same pivot with the levers extending in opposite lateral directions and carrying wheel spindles at their outer ends, a rigid dome-like pneumatic chamber arranged above each lever and rigidly mounted on the transverse supporting member with said chambers inclined eccentrically of the pivot, and a normally substantially flat diaphragm sealing the open side of each chamber and substantially centrally secured to the underlying lever, said spindles depending entirely for support on said levers.

References Cited in the file of this patent
UNITED STATES PATENTS

| | | |
|---|---|---|
| 1,677,419 | Wagner | July 17, 1928 |
| 2,030,710 | Opolo | Feb. 11, 1936 |
| 2,901,242 | Elliott | Aug. 25, 1959 |
| 2,914,339 | Gouirand | Nov. 24, 1959 |
| 2,934,352 | Polhemus | Apr. 26, 1960 |

FOREIGN PATENTS

| | | |
|---|---|---|
| 1,203,717 | France | Aug. 3, 1959 |